(12) United States Patent
Hayashi et al.

(10) Patent No.: US 11,549,608 B2
(45) Date of Patent: Jan. 10, 2023

(54) PILOT-TYPE ELECTROMAGNETIC VALVE

(71) Applicant: CKD Corporation, Aichi (JP)

(72) Inventors: Atsuo Hayashi, Aichi (JP); Shinji Itoh, Aichi (JP); Mitsuhiro Kosugi, Aichi (JP)

(73) Assignee: CKD CORPORATION, Aichi (JP)

( * ) Notice: Subject to any disclaimer, the term of this patent is extended or adjusted under 35 U.S.C. 154(b) by 203 days.

(21) Appl. No.: 17/255,946

(22) PCT Filed: May 11, 2020

(86) PCT No.: PCT/JP2020/018833
§ 371 (c)(1),
(2) Date: Dec. 23, 2020

(87) PCT Pub. No.: WO2020/230759
PCT Pub. Date: Nov. 19, 2020

(65) Prior Publication Data
US 2021/0324966 A1    Oct. 21, 2021

(30) Foreign Application Priority Data

May 15, 2019   (JP) .............................. JP2019-092380

(51) Int. Cl.
*F16K 31/42*      (2006.01)
*F16K 11/07*      (2006.01)
(Continued)

(52) U.S. Cl.
CPC .......... *F16K 31/423* (2013.01); *F16K 11/065* (2013.01); *F16K 17/0473* (2013.01); *F16K 27/003* (2013.01); *F16K 31/061* (2013.01)

(58) Field of Classification Search
CPC ....... Y10T 137/86614; Y10T 137/8671; F16K 11/07; F16K 27/003; F16K 31/0613; F16K 31/423
See application file for complete search history.

(56) References Cited

U.S. PATENT DOCUMENTS 5,558,126 A * 9/1996 Hayashi ................ F15B 13/043
                                                137/625.63
6,109,291 A * 8/2000 Yoshimura ............ F15B 13/043
                                                137/854
(Continued)

FOREIGN PATENT DOCUMENTS

DE    102007040929 B3    6/2008
JP    H0682479 U    11/1994
(Continued)

*Primary Examiner* — Seth W. MacKay-Smith
(74) *Attorney, Agent, or Firm* — Tarolli, Sundheim, Covell & Tummino LLP

(57) ABSTRACT

Passage forming blocks of a first pilot valve and a second pilot valve each include a supply passage, which opens in a first surface and a second surface and is connected to a valve chamber, a first output passage, which opens in the first surface and are connected to the valve chamber, and a second output passage, which opens in the first surface. Further, the passage forming blocks each include an output passage connecting recess. The output passage connecting recess is provided in a section of the second surface that overlaps with an opening region of the first output passage, which opens in the first surface, and is connected to the second output passage. The first output passage of the first pilot valve is connected to the second output passage of the second pilot valve via the output passage connecting recess of the second pilot valve.

6 Claims, 7 Drawing Sheets

(51) Int. Cl.
    *F16K 27/00*     (2006.01)
    *F16K 31/06*     (2006.01)
    *F16K 11/065*     (2006.01)
    *F16K 17/04*     (2006.01)

(56) References Cited

U.S. PATENT DOCUMENTS

| | | | | |
|---|---|---|---|---|
| 7,252,116 | B2 * | 8/2007 | Miyazoe | F15B 13/0857 |
| | | | | 137/271 |
| 7,438,088 | B2 * | 10/2008 | Matsumoto | F15B 13/0853 |
| | | | | 137/625.69 |
| 8,375,979 | B2 * | 2/2013 | Yoshimura | F16K 27/003 |
| | | | | 137/884 |
| 8,651,140 | B2 * | 2/2014 | Bogdanowicz | F15B 13/0875 |
| | | | | 137/884 |
| 9,528,616 | B2 * | 12/2016 | Nishiyama | F16K 11/10 |

FOREIGN PATENT DOCUMENTS

| | | |
|---|---|---|
| JP | H10332032 A | 12/1998 |
| JP | 2005308123 A | 11/2005 |

\* cited by examiner

PILOT-TYPE ELECTROMAGNETIC VALVE

RELATED APPLICATIONS

The present invention is a U.S. National Stage under 35 USC 371 patent application, claiming priority to Serial No. PCT/JP2020/018833, filed on 11 May 2020; which claims priority of JP 2019-092380, filed on 15 May 2019, the entirety of both of which are incorporated herein by reference.

TECHNICAL FIELD

The present invention relates to a pilot-type electromagnetic valve.

BACKGROUND ART

A pilot-type electromagnetic valve includes a casing with ports and a spool valve member, which reciprocates within the casing to switch connections between the ports. The casing has a first pilot pressure chamber and a second pilot pressure chamber at the opposite ends of the spool valve member. The pilot-type electromagnetic valve also includes a first pilot valve, which supplies pilot fluid to and discharges pilot fluid from the first pilot pressure chamber, and a second pilot valve, which supplies pilot fluid to and discharges pilot fluid from the second pilot pressure chamber. The first pilot valve supplies pilot fluid to and discharges pilot fluid from the first pilot pressure chamber. The second pilot valve supplies pilot fluid to and discharges pilot fluid from the second pilot pressure chamber. This causes the spool valve member to reciprocate to switch the connection between the ports.

The first pilot valve and the second pilot valve each include a solenoid. A plug-in structure has been known in the art as a wiring structure for supplying power to the solenoids. In the plug-in structure, the first pilot valve and the second pilot valve are installed in a manifold block. At the same time, the connection terminals of the first pilot valve and the connection terminals of the second pilot valve are connected to the connection terminals of the manifold block, which are connected to a main power supply. The wires of the plug-in structure, which has the above-described configuration, are not exposed to the outside. The plug-in structure is thus esthetically favorable and simplifies the wiring process.

For example, a pilot-type electromagnetic valve as disclosed in Patent Document 1 has been known, in which a first pilot valve and a second pilot valve are arranged to be adjacent to and coupled to each other. The pilot-type electromagnetic valve of Patent Document 1 is a one-side solenoid-type electromagnetic valve, in which the first pilot valve and the second pilot valve are arranged toward one side in the casing. A one-side solenoid-type electromagnetic valve is advantageous in that, if the plug-in structure is employed, the power supply structures, such as connection terminals of the manifold block, can easily be aggregated at one location.

It is now assumed that, for example, the second pilot valve is located closer to the casing than the first pilot valve in the one-side solenoid-type electromagnetic valve disclosed in Patent Document 1. In this case, the body of the first pilot valve has an output passage used to supply pilot fluid to and discharge pilot fluid from the first pilot pressure chamber. The body of the second pilot valve has an output passage used to supply pilot fluid to and discharge pilot fluid from the second pilot pressure chamber, and an additional passage different from the output passage. The additional passage is connected to the output passage of the first pilot valve, and is used to supply pilot fluid to and discharge pilot fluid from the first pilot pressure chamber. As described above, the bodies of the first pilot valve and the second pilot valve have different passage structures. Accordingly, two types of bodies are required, resulting in a poor production efficiency.

PRIOR ART DOCUMENT

Patent Document

Patent Document 1: German Patented Invention No. 102007040929

SUMMARY OF THE INVENTION

Problems that the Invention is to Solve

Accordingly, it is an objective of the present invention to provide a pilot-type electromagnetic valve that improves production efficiency.

Means for Solving the Problems

To achieve the foregoing objectives, and in accordance with a first aspect of the present invention, a pilot-type electromagnetic valve is provided that includes a casing including ports, a spool valve member that is reciprocated in the casing to switch connections between the ports, a first pilot pressure chamber and a second pilot pressure chamber provided at opposite ends of the spool valve member in the casing, a first pilot valve that supplies pilot fluid to and discharges pilot fluid from the first pilot pressure chamber, and a second pilot valve that supplies pilot fluid to and discharges pilot fluid from the second pilot pressure chamber. The first pilot valve and the second pilot valve are arranged to be adjacent to and coupled to each other. The first pilot valve and the second pilot valve each have a rectangular block-shaped body. The body has a first surface and a second surface located on a side opposite from the first surface. Each body includes a valve chamber in which a pilot valve member is movably accommodated, a supply passage that opens in the first surface and the second surface, and is connected to the valve chamber, a first output passage, a second output passage, and an output passage connecting recess. The first output passage opens in the first surface and is connected to the valve chamber. The first output passage is configured to supply pilot fluid to and discharge pilot fluid from the first pilot pressure chamber or the second pilot pressure chamber. The second output passage opens in the first surface. The second output passage is configured to supply pilot fluid to and discharge pilot fluid from the first pilot pressure chamber or the second pilot pressure chamber. The output passage connecting recess is provided in a section of the second surface that overlaps with an opening region of the first output passage, which opens in the first surface. The output passage connecting recess is connected to the second output passage.

MODES FOR CARRYING OUT THE INVENTION

A pilot-type electromagnetic valve according to an embodiment will now be described with reference to FIGS. 1 to 10. The pilot-type electromagnetic valve of the present embodiment forms an electromagnetic valve manifold together with a manifold block.

Figure 1:
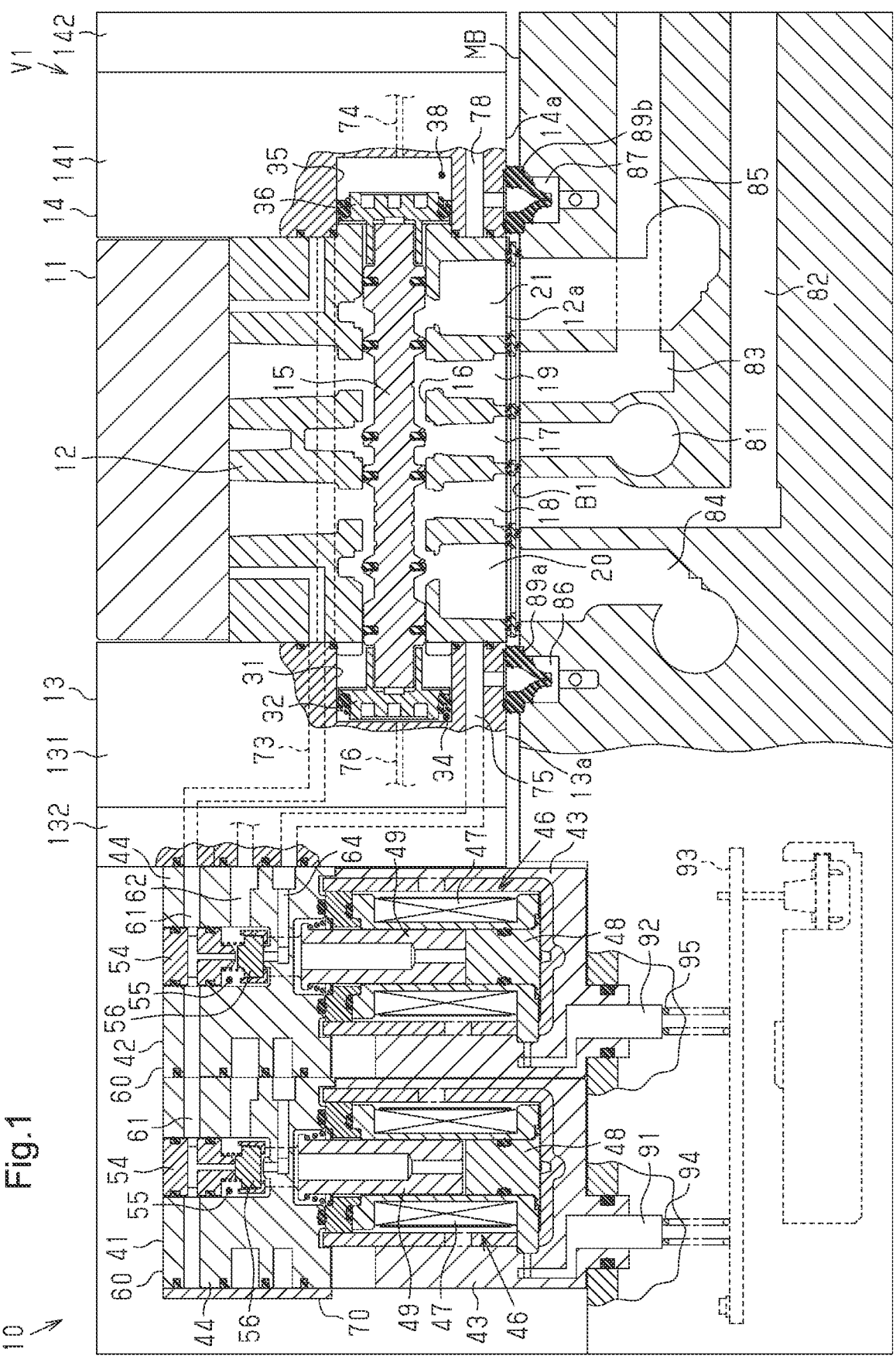
FIG. 1 is a cross-sectional view of an electromagnetic valve manifold according to one embodiment of the present invention.

As shown in FIG. 1, the pilot-type electromagnetic valve 10 is mounted on a placement surface B1 of the manifold block MB. The pilot-type electromagnetic valve 10 includes a main valve unit V1, a first pilot valve 41, and a second pilot valve 42. The main valve unit V1 includes a casing 11, which is an elongated rectangular block placed on the placement surface B1 of the manifold block MB.

The casing 11 includes an elongated rectangular block-shaped casing body 12, a first coupling block 13, which is coupled to a first end in the longitudinal direction of the casing body 12, and a second coupling block 14, which is coupled to a second end in the longitudinal direction of the casing body 12. The casing body 12, the first coupling block 13, and the second coupling block 14 are made of, for example, plastic. The casing body 12 includes a body facing surface 12a, which faces the placement surface B1 of the manifold block MB. The first coupling block 13 includes a first facing surface 13a, which faces the placement surface B1 of the manifold block MB. The second coupling block 14 includes a second facing surface 14a, which faces the placement surface B1 of the manifold block MB.

The first coupling block 13 includes a first block body 131 and a first adapter 132. The first block body 131 is coupled to the first end of the casing body 12. The first adapter 132 is coupled to a surface of the first block body 131 at the side opposite from the casing body 12. The second coupling block 14 includes a second block body 141 and a second adapter 142. The second block body 141 is coupled to the second end of the casing body 12. The second adapter 142 is coupled to a surface of the second block body 141 at the side opposite from the casing body 12.

Figure 2:
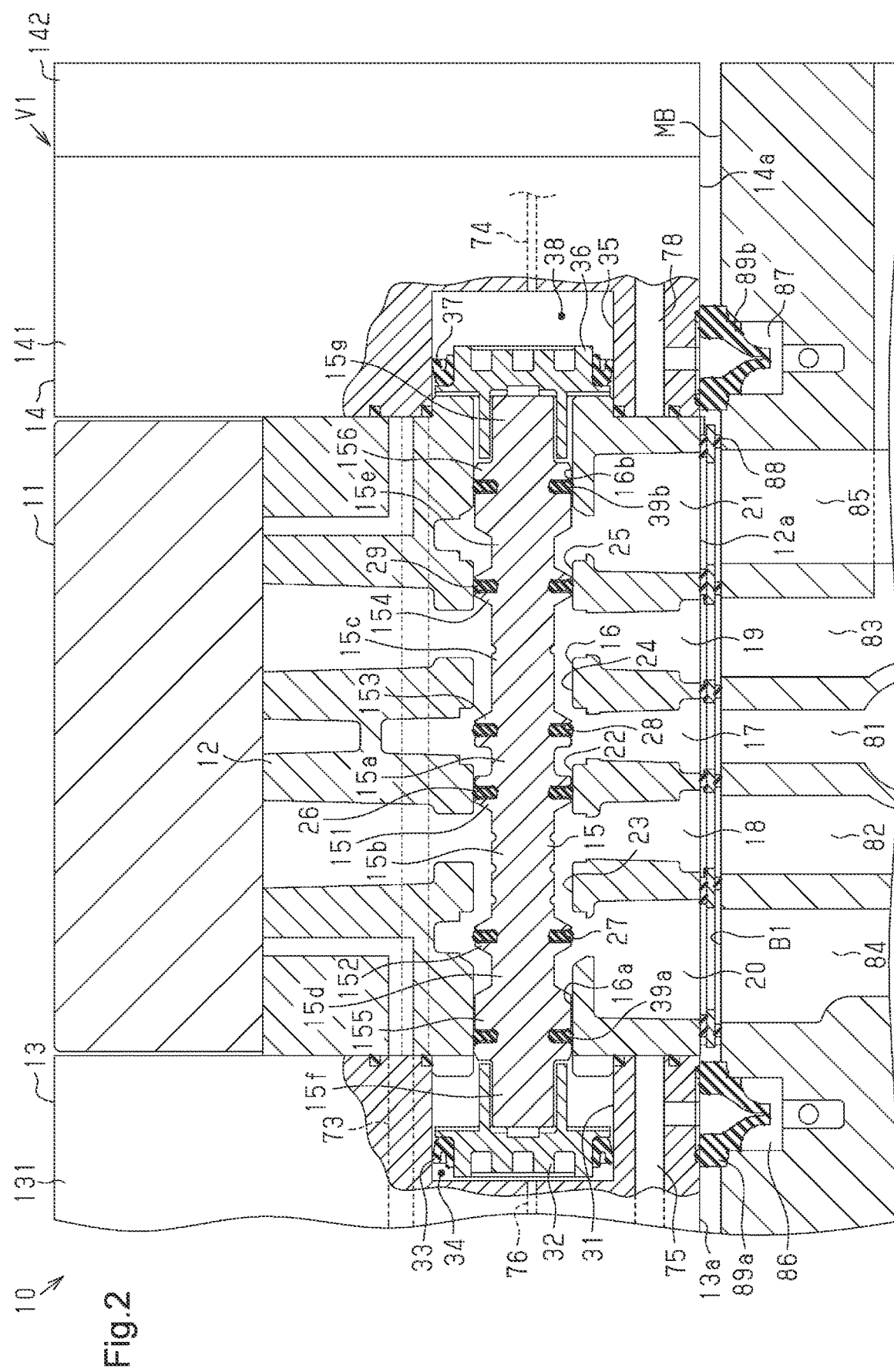
FIG. 2 is an enlarged cross-sectional view showing a casing and a manifold block.

As shown in FIG. 2, the casing body 12 has a circular valve hole 16 that accommodates a spool valve member 15. The valve hole 16 extends in the longitudinal direction of the casing body 12. A first end of the valve hole 16 opens in a first end face of the casing body 12. A second end of the valve hole 16 opens in a second end face of the casing body 12. The valve hole 16 thus passes through the casing body 12 in the longitudinal direction. The spool valve member 15 is allowed to reciprocate in the valve hole 16.

The casing body 12 has a supply port 17, a first output port 18, a second output port 19, a first discharge port 20, and a second discharge port 21. The casing 11 thus has multiple ports. The pilot-type electromagnetic valve 10 of the present embodiment is a five-port electromagnetic valve.

The first discharge port 20, the first output port 18, the supply port 17, the second output port 19, the second discharge port 21 are arranged in that order from the first end toward the second end of the casing body 12. The first ends of the supply port 17, the first output port 18, the second output port 19, the first discharge port 20, and the second discharge port 21 are connected to the valve hole 16. The second ends of the supply port 17, the first output port 18, the second output port 19, the first discharge port 20, and the second discharge port 21 open in the body facing surface 12a of the casing body 12.

The inner circumferential surface of the valve hole 16 includes a first valve seat portion 22 between the supply port 17 and the first output port 18. The inner circumferential surface of the valve hole 16 also includes a second valve seat portion 23 between the first output port 18 and the first discharge port 20. A third valve seat portion 24 is provided between the supply port 17 and the second output port 19. A fourth valve seat portion 25 is provided between the second output port 19 and the second discharge port 21. The first valve seat portion 22, the second valve seat portion 23, the third valve seat portion 24, and the fourth valve seat portion 25 form parts of the inner circumferential surface of the valve hole 16 and are annular.

The valve hole 16 also has a first hole portion 16a. The first hole portion 16a is connected to the first discharge port 20 and forms a first end of the valve hole 16, which is spaced apart from the second valve seat portion 23. The valve hole 16 further has a second hole portion 16b. The second hole portion 16b is connected to the second discharge port 21 and forms a second end of the valve hole 16, which is spaced apart from the fourth valve seat portion 25. The first valve seat portion 22, the second valve seat portion 23, the third valve seat portion 24, the fourth valve seat portion 25, the first hole portion 16a, and the second hole portion 16b have the same inner diameter.

The spool valve member 15 includes a first valve portion 151, a second valve portion 152, a third valve portion 153, a fourth valve portion 154, a fifth valve portion 155, and a sixth valve portion 156, which are spaced apart from each other in the axial direction of the spool valve member 15. The fifth valve portion 155, the second valve portion 152, the first valve portion 151, the third valve portion 153, the fourth valve portion 154, the sixth valve portion 156 are arranged in that order from the first end toward the second end in the axial direction of the spool valve member 15. The first valve portion 151, the second valve portion 152, the third valve portion 153, the fourth valve portion 154, the fifth valve portion 155, and the sixth valve portion 156 have the same outer diameter.

The spool valve member 15 includes a first shaft portion 15a, which couples the first valve portion 151 and the third valve portion 153 to each other, a second shaft portion 15b, which couples the first valve portion 151 and the second valve portion 152 to each other, and a third shaft portion 15c, which couples the third valve portion 153 and the fourth valve portion 154 to each other. The spool valve member 15 also includes a fourth shaft portion 15d, which couples the second valve portion 152 and the fifth valve portion 155 to each other, and a fifth shaft portion 15*e*, which couples the fourth valve portion 154 and the sixth valve portion 156 to each other.

The spool valve member 15 includes a columnar first protruding portion 15*f*. The first protruding portion 15*f* protrudes from the end face of the fifth valve portion 155 that is opposite from the fourth shaft portion 15*d*. The first protruding portion 15*f* is a first end in the axial direction of the spool valve member 15. The spool valve member 15 also includes a columnar second protruding portion 15*g*. The second protruding portion 15*g* protrudes from the end face of the sixth valve portion 156 that is opposite from the fifth shaft portion 15*e*. The second protruding portion 15*g* is a second end in the axial direction of the spool valve member 15.

The first shaft portion 15*a*, the second shaft portion 15*b*, the third shaft portion 15*c*, the fourth shaft portion 15*d*, the fifth shaft portion 15*e*, the first protruding portion 15*f*, and the second protruding portion 15*g* have the same outer diameter. The outer diameter of the first valve portion 151, the second valve portion 152, the third valve portion 153, the fourth valve portion 154, the fifth valve portion 155, and the sixth valve portion 156 is larger than the diameter of the first shaft portion 15*a*, the second shaft portion 15*b*, the third shaft portion 15*c*, the fourth shaft portion 15*d*, the fifth shaft portion 15*e*, the first protruding portion 15*f*, and the second protruding portion 15*g*.

A first spool packing 26 is attached to the outer circumferential surface of the first valve portion 151. The first spool packing 26 serves as a seal between the supply port 17 and the first output port 18 when the first valve portion 151 is seated on the first valve seat portion 22. A second spool packing 27 is attached to the outer circumferential surface of the second valve portion 152. The second spool packing 27 serves as a seal between the first output port 18 and the first discharge port 20 when the second valve portion 152 is seated on the second valve seat portion 23. A third spool packing 28 is attached to the outer circumferential surface of the third valve portion 153. The third spool packing 28 serves as a seal between the supply port 17 and the second output port 19 when the third valve portion 153 is seated on the third valve seat portion 24. A fourth spool packing 29 is attached to the outer circumferential surface of the fourth valve portion 154. The fourth spool packing 29 serves as a seal between the second output port 19 and the second discharge port 21 when the fourth valve portion 154 is seated on the fourth valve seat portion 25. The first spool packing 26, the second spool packing 27, the third spool packing 28, and the fourth spool packing 29 are made of rubber and annular.

The first coupling block 13 includes a first piston accommodating recess 31, which is a circular hole connected to the first hole portion 16*a*. The first protruding portion 15*f* of the spool valve member 15 is configured to selectively enter the first piston accommodating recess 31 from the first hole portion 16*a* and retract from the first piston accommodating recess 31 into the first hole portion 16*a*. The first piston accommodating recess 31 accommodates a disk-shaped first piston 32, while allowing the first piston 32 to reciprocate. The first piston 32 is attached to the distal end of the first protruding portion 15*f* of the spool valve member 15. A first lip packing 33 is attached to the outer circumferential surface of the first piston 32. The first lip packing 33 serves as a seal between the first piston 32 and the inner circumferential surface of the first piston accommodating recess 31. The first piston 32 defines a first pilot pressure chamber 34 inside the first piston accommodating recess 31. Pilot fluid is supplied to and discharged from the first pilot pressure chamber 34.

The second coupling block 14 includes a second piston accommodating recess 35, which is a circular hole connected to the second hole portion 16*b*. The inner diameter of the second piston accommodating recess 35 is the same as that of the first piston accommodating recess 31. The second protruding portion 15*g* of the spool valve member 15 is configured to selectively enter the second piston accommodating recess 35 from the second hole portion 16*b* and retract from the second piston accommodating recess 35 into the second hole portion 16*b*. The second piston accommodating recess 35 accommodates a disk-shaped second piston 36, while allowing the second piston 36 to reciprocate. The second piston 36 is attached to the distal end of the second protruding portion 15*g* of the spool valve member 15. The outer diameter of the second piston 36 is the same as that of the first piston 32. A second lip packing 37 is attached to the outer circumferential surface of the second piston 36. The second lip packing 37 serves as a seal between the second piston 36 and the inner circumferential surface of the second piston accommodating recess 35. The second piston 36 defines a second pilot pressure chamber 38 inside the second piston accommodating recess 35. As described above, the first pilot pressure chamber 34 and the second pilot pressure chamber 38 are provided at the opposite ends of the spool valve member 15 in the casing 11. Pilot fluid is supplied to and discharged from the second pilot pressure chamber 38.

The outer diameter of the first piston 32 is the same as that of the second piston 36. Accordingly, the pressure receiving area of the first piston 32, which receives the pressure of the pilot fluid in the first pilot pressure chamber 34, is the same as the pressure receiving area of the second piston 36, which receives the pressure of the pilot pressure in the second pilot pressure chamber 38.

A first seal member 39*a* is attached to the outer circumferential surface of the fifth valve portion 155. The first seal member 39*a* serves as a seal between the fifth valve portion 155 and the first hole portion 16*a*. The first seal member 39*a* is annular and made of rubber. The first seal member 39*a* limits leakage of fluid from the first discharge port 20 to the first piston accommodating recess 31 via the first hole portion 16*a*.

A second seal member 39*b* is attached to the outer circumferential surface of the sixth valve portion 156. The second seal member 39*b* serves as a seal between the sixth valve portion 156 and the second hole portion 16*b*. The second seal member 39*b* is annular and made of rubber. The second seal member 39*b* limits leakage of fluid from the second discharge port 21 to the second piston accommodating recess 35 via the second hole portion 16*b*.

Figure 3:
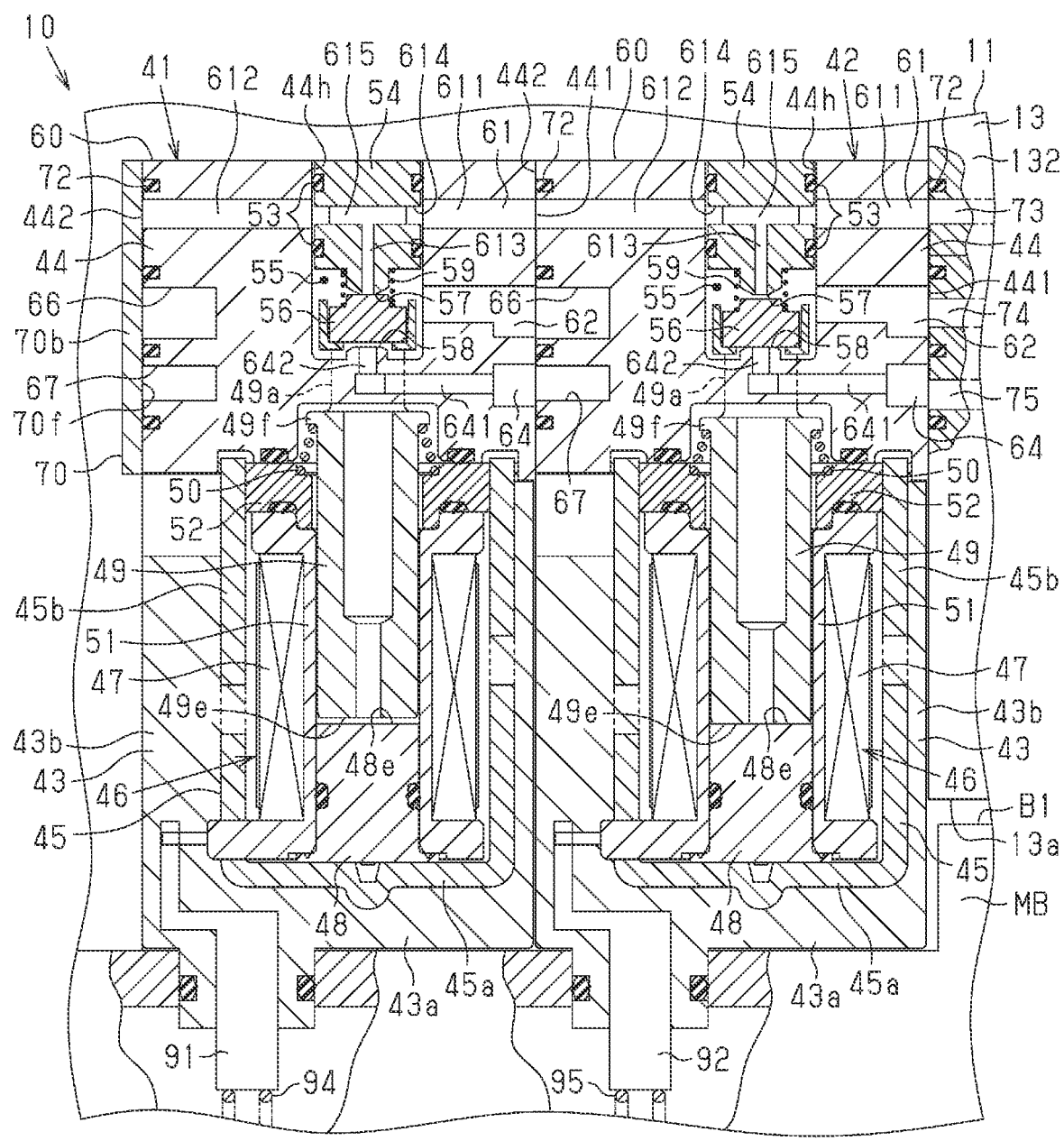
FIG. 3 is a cross-sectional view showing a first pilot valve and a second pilot valve.

As shown in FIG. 3, the first pilot valve 41 and the second pilot valve 42 have the same structure. The first pilot valve 41 and the second pilot valve 42 each have a rectangular block-shaped body 60. Each body 60 includes a solenoid case 43, which is shaped like a rectangular tube with a closed end, and a passage forming block 44, which is coupled to the solenoid case 43 and shaped like a rectangular block. The solenoid case 43 and the passage forming block 44 are made of, for example, plastic. The solenoid case 43 and the passage forming block 44 are thus made of a non-magnetic material.

The solenoid case 43 has a rectangular plate shaped bottom wall 43*a* and a rectangular tube-shaped peripheral wall 43*b*, which extends from the periphery of the bottom wall 43*a*. The passage forming block 44 is coupled to the open end of the peripheral wall 43b of the solenoid case 43. That is, the passage forming block 44 is coupled to the end opposite from the bottom wall 43a. The passage forming block 44 closes the opening of the peripheral wall 43b. A magnetic frame 45, which is made of a magnetic material, is fixed to the solenoid case 43. The magnetic frame 45 includes a plate-shaped bottom portion 45a and a tubular extending portion 45b. The bottom portion 45a extends along the inner surface of the bottom wall 43a of the solenoid case 43. The extending portion 45b extends from the periphery of the bottom portion 45a and along the inner circumferential surface of the peripheral wall 43b of the solenoid case 43.

The first pilot valve 41 and the second pilot valve 42 each have a solenoid 46. Each solenoid 46 includes a coil 47, a fixed iron core 48, a plunger 49, and a plunger spring 50. The fixed iron core 48 and the plunger 49 are made of a magnetic material. The solenoid case 43 accommodates a tubular bobbin 51, about which the coil 47 is wound. The axis of the bobbin 51 matches the axis of the extending portion 45b of the magnetic frame 45.

The fixed iron core 48 is accommodated in the solenoid case 43. The fixed iron core 48 is shaped like a pillar. The fixed iron core 48 is fixed to the bobbin 51 while being inserted into the bobbin 51. The axis of the fixed iron core 48 matches the axis of the bobbin 51. The length in the axial direction of the fixed iron core 48 is shorter than the length in the axial direction of the bobbin 51. The fixed iron core 48 has a flat end face 48e at the side opposite from the bottom portion 45a of the magnetic frame 45. The end face 48e of the fixed iron core 48 is located inside the bobbin 51.

The plunger 49 is shaped like a pillar that is inserted into the bobbin 51. The plunger 49 is located between the fixed iron core 48 and the passage forming block 44. The axis of the plunger 49 matches the axis of the fixed iron core 48. The plunger 49 has a flat end face 49e facing the fixed iron core 48. The end face 49e of the plunger 49 is configured to be held in area contact with the end face 48e of the fixed iron core 48. The end of the plunger 49 at the side opposite from the fixed iron core 48 protrudes from the bobbin 51. An annular flange 49f protrudes from the end of the outer circumferential surface of the plunger 49 at the side opposite from the fixed iron core 48.

A tubular magnetic core 52 is arranged in the magnetic frame 45. Specifically, the magnetic core 52 is located inside the end of the extending portion 45b that is opposite from the bottom portion 45a. The magnetic core 52 is located between the bobbin 51 and the passage forming block 44. The outer circumferential surface of the magnetic core 52 contacts the inner circumferential surface of the extending portion 45b of the magnetic frame 45. The plunger 49 passes through inside the magnetic core 52.

The plunger spring 50 is arranged between the magnetic core 52 and the flange 49f of the plunger 49. The plunger spring 50 has a first end, which is supported by an end face of the magnetic core 52, and a second end which is supported by the flange 49f of the plunger 49. The plunger spring 50 urges the plunger 49 in a direction in which the end face 49e of the plunger 49 separates away from the end face 48e of the fixed iron core 48.

The passage forming block 44 has a circular accommodating hole 44h, which has a closed end, in the end face opposite from the solenoid case 43. The axis of the accommodating hole 44h matches the axis of the plunger 49. Each body 60 includes a columnar plug 54, which is attached to the accommodating hole 44h. Each plug 54 is attached to the corresponding accommodating hole 44h with seal members 53. The plug 54 closes the opening of the accommodating hole 44h. The plug 54 cooperates with the accommodating hole 44h to define a valve chamber 55 inside the passage forming block 44.

The valve chamber 55 accommodates a pilot valve member 56. The end face of the plug 54 that is arranged inside the valve chamber 55 has a first valve seat 57, on which the pilot valve member 56 is seated. The bottom surface of the accommodating hole 44h has a second valve seat 58, on which the pilot valve member 56 is seated. The pilot valve member 56 is configured to contact and separate from the first valve seat 57 and the second valve seat 58. The pilot valve member 56 is accommodated in the valve chamber 55, while being allowed to move between the first valve seat 57 and the second valve seat 58. The first valve seat 57 and the second valve seat 58 are arranged to be opposed to each other in the moving direction of the pilot valve member 56 in the valve chamber 55.

The valve chamber 55 incorporates a valve member spring 59 located between the pilot valve member 56 and the plug 54. The valve member spring 59 urges the pilot valve member 56 away from the first valve seat 57. The urging force of the valve member spring 59 is smaller than the urging force of the plunger spring 50.

The plunger 49 includes two elongated plate-shaped valve pushing portions 49a. The valve pushing portions 49a project from the end of the plunger 49 on the side opposite from the fixed iron core 48. The valve pushing portions 49a pass through the passage forming block 44 and project into the valve chamber 55. The distal ends of the valve pushing portions 49a contact the pilot valve member 56.

Figure 4:
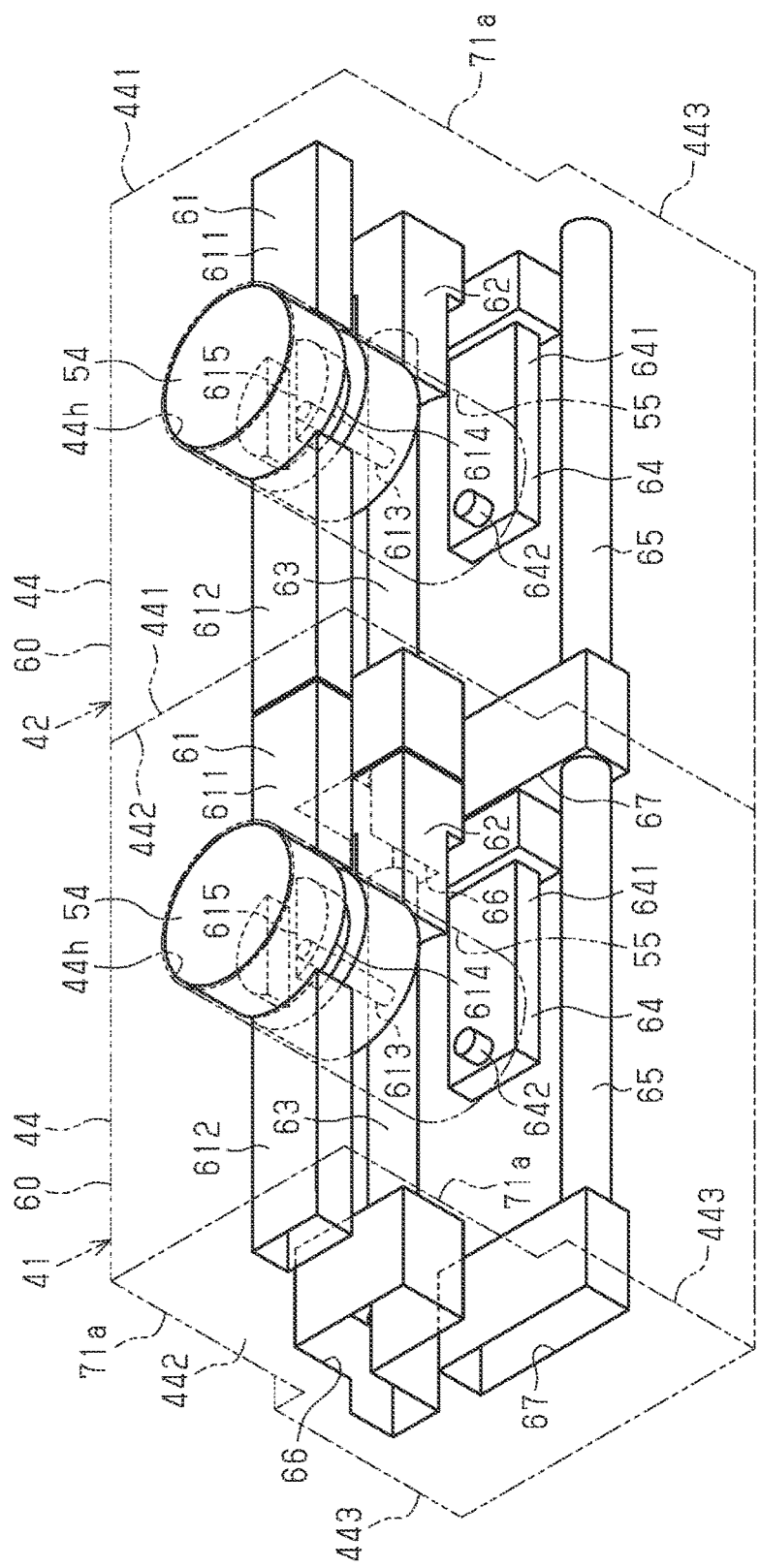
FIG. 4 is a perspective view schematically showing the first pilot valve and the second pilot valve.

As shown in FIGS. 3 and 4, each passage forming block 44 has a supply passage 61, a first output passage 62, a second output passage 63, a first discharge passage 64, and a second discharge passage 65. The supply passage 61 includes a first hole 611, a second hole 612, a third hole 613, a groove 614, and a through-hole 615. The first hole 611 has a first end, which opens in a first surface 441 of the passage forming block 44, and a second end, which opens in the accommodating hole 44h. The first hole 611 extends straight from the first surface 441 of the passage forming block 44 toward the accommodating hole 44h and passes through the passage forming block 44. The second hole 612 has a first end and a second end. The first end opens in a second surface 442 of the passage forming block 44, which is opposite from the first surface 441. The second end opens in the accommodating hole 44h. The first surface 441 and the second surface 442 are parallel with each other. The second hole 612 extends straight from the second surface 442 of the passage forming block 44 toward the accommodating hole 44h and passes through the passage forming block 44.

The groove 614 extends over the entire outer circumferential surface of the plug 54. The first hole 611 and the second hole 612 are connected to the interior of the groove 614. The through-hole 615 is connected to the groove 614 and extends in the radial direction of the plug 54 to pass through the plug 54. The third hole 613 has a first end, which opens in the through-hole 615, and a second end, which opens in the distal end of the first valve seat 57. The third hole 613 extends straight from the through-hole 615 toward the distal end of the first valve seat 57 to pass through the plug 54. The third hole 613 is connected to the valve chamber 55. The supply passage 61 thus opens in the first surface 441 and the second surface 442 of the passage forming block 44, and is connected to the valve chamber 55.

The first output passage 62 has a first end, which opens in a first surface 441 of the passage forming block 44, and a second end, which opens in the accommodating hole 44h. The second end of the first output passage 62 opens in the accommodating hole 44h at a position between the plug 54 and the bottom surface of the accommodating hole 44h. The first output passage 62 is thus connected to the valve chamber 55.

The first discharge passage 64 includes a first hole 641 and a second hole 642. The first hole 641 has a first end, which opens in the first surface 441 of the passage forming block 44, and a second end, which extends to the interior of the passage forming block 44. The second hole 642 has a first end, which is connected to the second end of the first hole 641, and a second end, which opens in the distal end of the second valve seat 58. The second hole 642 is connected to the valve chamber 55. The first discharge passage 64 thus opens in the first surface 441 of the passage forming block 44, and is connected to the valve chamber 55.

Figure 5:
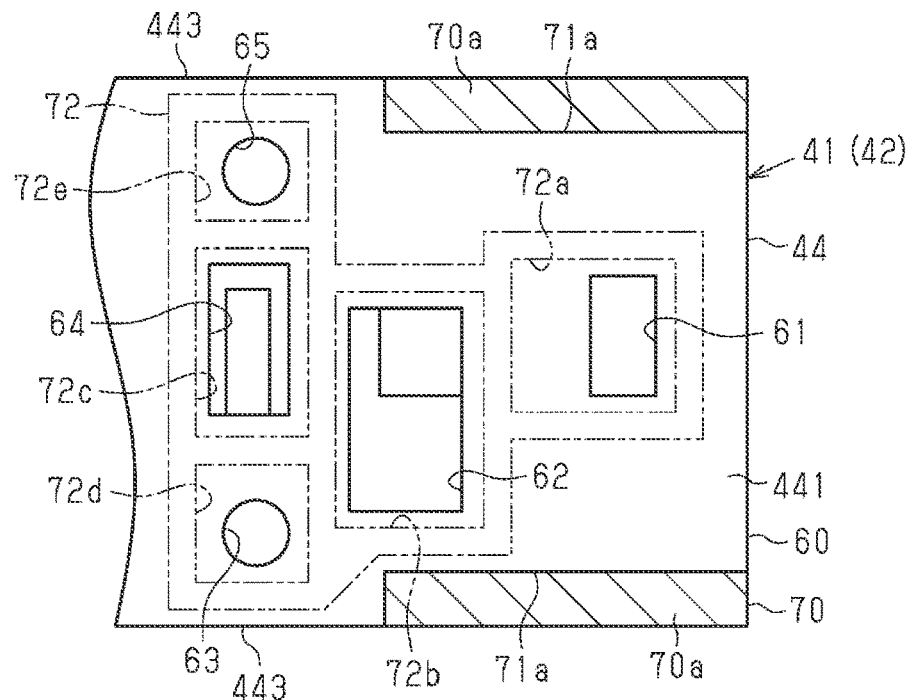
FIG. 5 is a cross-sectional view of a passage forming block, as seen from the side corresponding to a first surface.

As shown in FIG. 5, the supply passage 61, the first output passage 62, and the first discharge passage 64 are arranged in that order in the moving direction of the pilot valve member 56. The opening of the supply passage 61 in the first surface 441 and the opening of the first discharge passage 64 in the first surface 441 are arranged on the opposite sides of the opening of the first output passage 62 in the first surface 441 when viewed in the moving direction of the pilot valve member 56.

As shown in FIGS. 4 and 5, the second output passage 63 includes a first end, which opens in the first surface 441 of the passage forming block 44, and a second end, which extends toward the second surface 442 of the passage forming block 44. The second output passage 63 extends straight from the first surface 441 toward the second surface 442. That is, the second output passage 63 extends in a direction orthogonal to the first surface 441 and the second surface 442. As shown in FIG. 5, the second output passage 63 is arranged between the first discharge passage 64 and one of opposite side surfaces 443 of the passage forming block 44, when viewed in a direction orthogonal to the moving direction of the pilot valve member 56. The opposite side surfaces 443 of the passage forming block 44 are a pair of surfaces that connects the first surface 441 and the second surface 442 to each other.

As shown in FIGS. 4 and 5, the second discharge passage 65 includes a first end, which opens in the first surface 441 of the passage forming block 44, and a second end, which extends toward the second surface 442 of the passage forming block 44. The second discharge passage 65 extends straight from the first surface 441 toward the second surface 442. That is, the second discharge passage 65 extends in a direction orthogonal to the first surface 441 and the second surface 442. The second discharge passage 65 and the second output passage 63 extend parallel to each other. As shown in FIG. 5, the second discharge passage 65 is arranged between the first discharge passage 64 and the other one of the opposite side surfaces 443.

Figure 6:
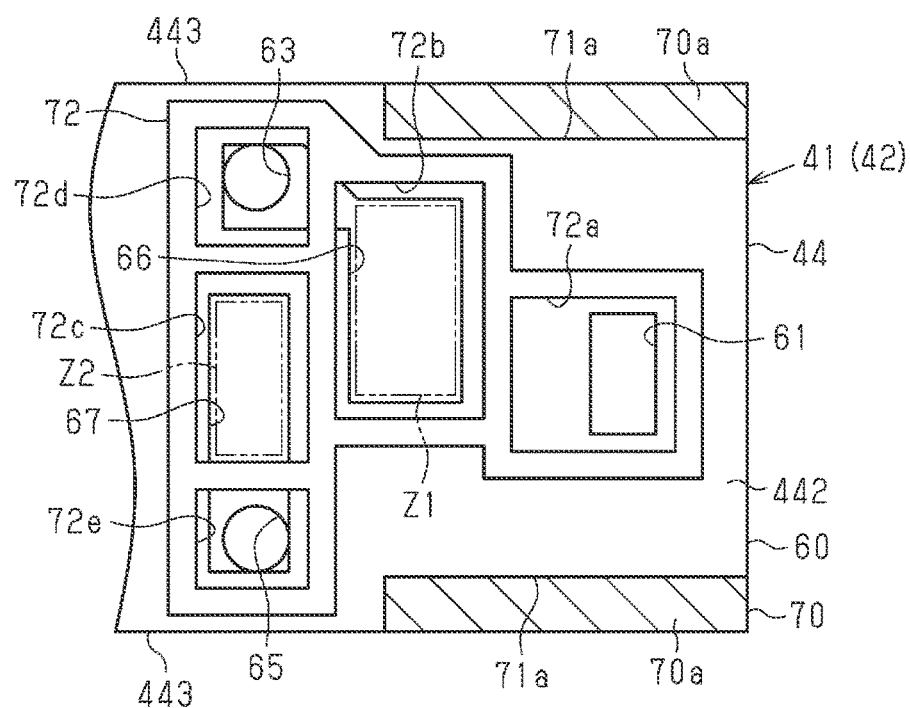
FIG. 6 is a cross-sectional view of the passage forming block, as seen from the side corresponding to a second surface.
Figure 7:
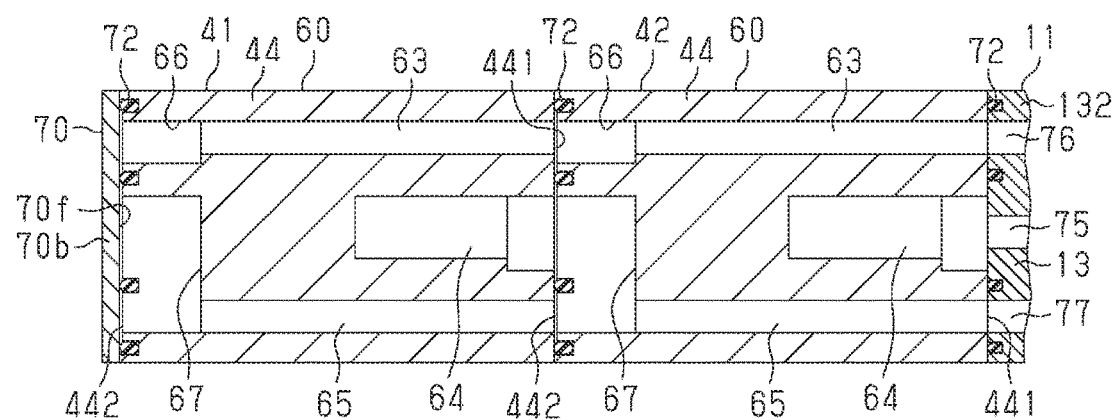
FIG. 7 is a cross-sectional view of the first pilot valve and the second pilot valve.

As shown in FIGS. 4, 6, and 7, each passage forming block 44 includes an output passage connecting recess 66. The output passage connecting recess 66 is formed in the second surface 442 of the passage forming block 44. The output passage connecting recess 66 is provided in an area that includes a section overlapping with an opening region Z1 of the first output passage 62, which opens in the first surface 441, and a section overlapping with the second output passage 63. The output passage connecting recess 66 is connected to an end of the second output passage 63.

The passage forming block 44 includes a discharge passage connecting recess 67. The discharge passage connecting recess 67 is also formed in the second surface 442 of the passage forming block 44. The discharge passage connecting recess 67 is provided in an area that includes a section overlapping with an opening region Z2 of the first discharge passage 64, which opens in the first surface 441, and a section overlapping with the second discharge passage 65. The discharge passage connecting recess 67 is connected to the second end of the second discharge passage 65.

As shown in FIG. 3, the first pilot valve 41 is installed in the casing 11 while being arranged adjacent to the second pilot valve 42. The second pilot valve 42 is arranged between the first pilot valve 41 and the first coupling block 13 of the casing 11. The first pilot valve 41 and the second pilot valve 42 are arranged at an end of the first coupling block 13 that is opposite from the casing body 12. The pilot-type electromagnetic valve 10 of the present embodiment is a one-side solenoid-type electromagnetic valve, in which the first pilot valve 41 and the second pilot valve 42 are arranged toward one side in the casing 11.

The first surface 441 of the passage forming block 44 of the second pilot valve 42 is held in contact with the surface of the first adapter 132 that is at the side opposite from the casing body 12. The first surface 441 of the passage forming block 44 of the first pilot valve 41 is held in contact with the second surface 442 of the passage forming block 44 of the second pilot valve 42.

As shown in FIG. 4, the supply passage 61 of the first pilot valve 41 and the supply passage 61 of the second pilot valve 42 are connected to each other. Also, the output passage connecting recess 66 of the passage forming block 44 of the second pilot valve 42 is connected to the first output passage 62 of the first pilot valve 41. Thus, the first output passage 62 of the first pilot valve 41 is connected to the second output passage 63 of the second pilot valve 42 via the output passage connecting recess 66 of the second pilot valve 42. Also, the discharge passage connecting recess 67 of the passage forming block 44 of the second pilot valve 42 is connected to the first discharge passage 64 of the first pilot valve 41. Thus, the first discharge passage 64 of the first pilot valve 41 is connected to the second discharge passage 65 of the second pilot valve 42 via the discharge passage connecting recess 67 of the second pilot valve 42.

As shown in FIG. 3, in the first pilot valve 41, the opening of the supply passage 61 in the second surface 442, the output passage connecting recess 66, and the discharge passage connecting recess 67 are closed by a fixing clip 70.

Figure 8:
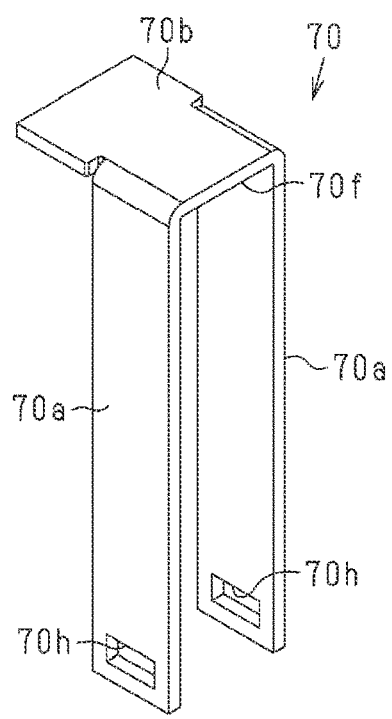
FIG. 8 is a perspective view of a fixing clip.

FIG. 8 shows the fixing clip 70, which is made of metal. The fixing clip 70 includes two extending portions 70a and a coupling portion 70b. The extending portions 70a are thin elongated plates that extend parallel to each other. The coupling portion 70b is a thin elongated plate that couples ends of the extending portions 70a in the longitudinal direction to each other. The coupling portion 70b extends in a direction orthogonal to the extending direction of the extending portions 70a. In a plan view, the coupling portion 70b has the same shape as the second surface 442 of the passage forming block 44. Each extending portion 70a has an engagement hole 70h in the end at the side opposite from the coupling portion 70b. The engagement hole 70h passes through the extending portion 70a in the thickness direction. The engagement hole 70h is rectangular.

Figure 9:
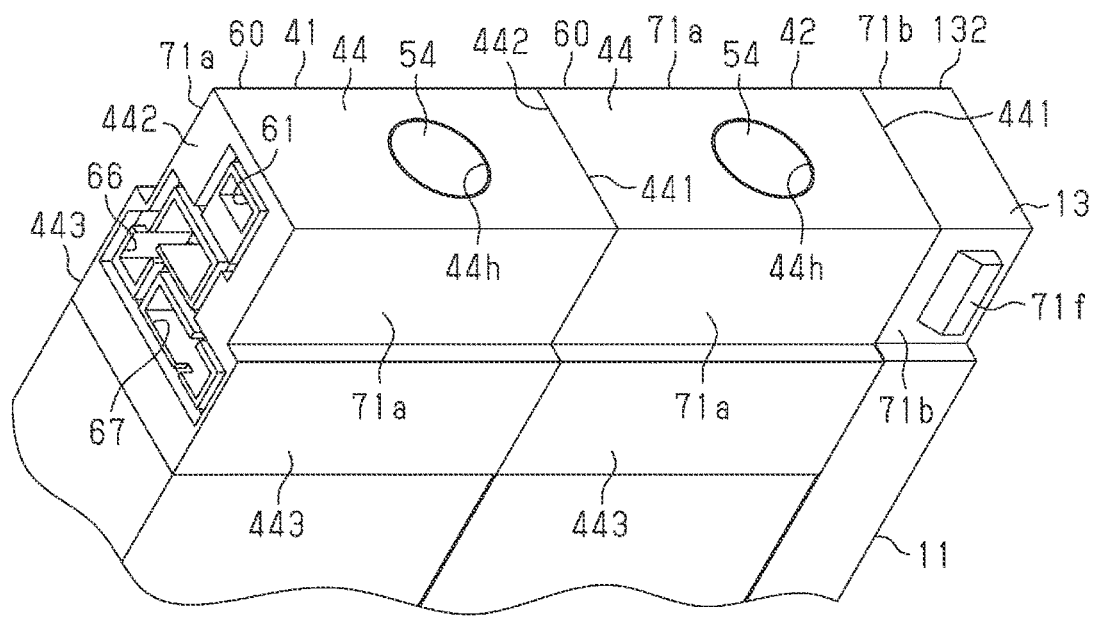
FIG. 9 is a perspective view partially showing the first pilot valve and the second pilot valve.

As shown in FIG. 9, each passage forming block 44 has a first guide groove 71a in each of the side surfaces 443. The two first guide grooves 71a extend parallel to each other. The first guide grooves 71a extend from the first surface 441 to the second surface 442. The first adapter 132 has a second guide groove 71b, which is connected to the first guide grooves 71a, on each of the side surfaces that are connected to the side surfaces 443 of the passage forming block 44. Each first guide groove 71a and the corresponding second guide groove 71b are in the same plane. Each second guide groove 71b has an engagement projection 71f, which is engaged with the corresponding engagement hole 70h. As shown in FIG. 5, the first guide grooves 71a are arranged on the opposite sides of the opening of the supply passage 61 in the first surface 441 and on the opposite sides of the opening of the first output passage 62 in the first surface 441, when viewed from the first surface 441.

Figure 10:
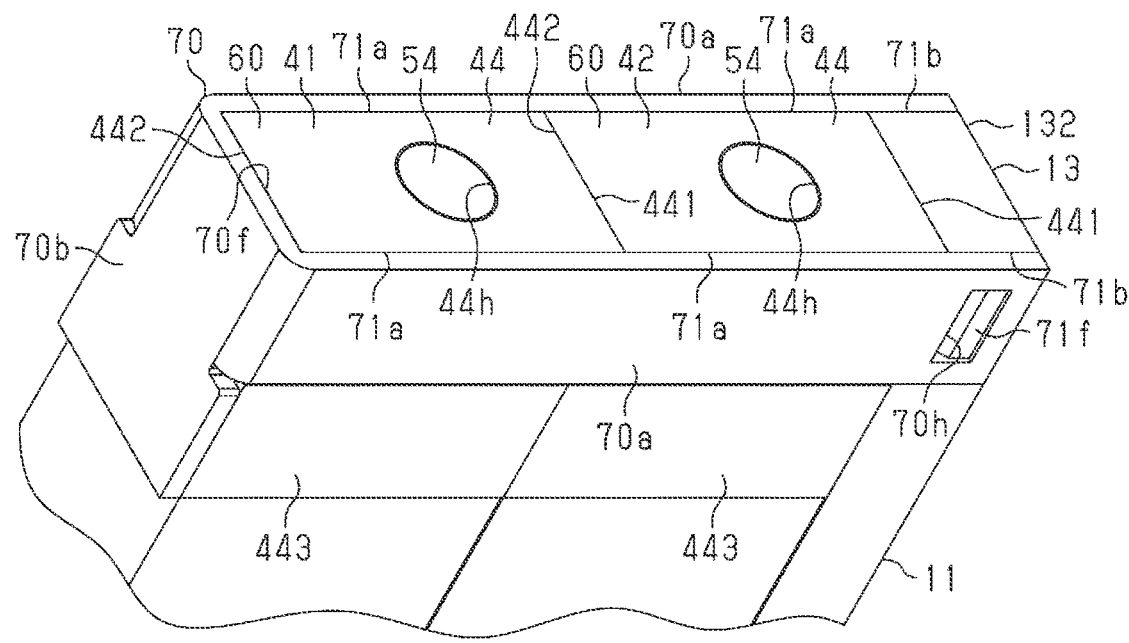
FIG. 10 is a perspective view partially showing a state in which the first pilot valve and the second pilot valve are fixed to the casing.

FIG. 10 illustrates a state in which the first pilot valve 41 and the second pilot valve 42 are adjacent to each other. In this state, the extending portions 70a are guided to the second guide grooves 71b through the first guide grooves 71a, and the engagement holes 70h are engaged with the engagement projections 71f. In this manner, the engagement holes 70h are engaged with the engagement projections 71f, so that the extending portions 70a are fixed to the first adapter 132. This fixes the fixing clip 70 to the first adapter 132. As shown in FIG. 5, the two extending portions 70a are arranged on the opposite sides of the opening of the supply passage 61 in the first surface 441 and on the opposite sides of the opening of the first output passage 62 in the first surface 441, when viewed from the first surface 441.

As shown in FIG. 3, the coupling portion 70b of the fixing clip 70 is held in contact with the entire second surface 442 of the passage forming block 44 of the first pilot valve 41. The coupling portion 70b closes the supply passage 61, the output passage connecting recess 66, and the discharge passage connecting recess 67, which open in the second surface 442 of the passage forming block 44 of the first pilot valve 41. Since the extending portions 70a are fixed to the first adapter 132, the first pilot valve 41 and the second pilot valve 42 are fixed to the first adapter 132, while being held between the coupling portion 70b of the fixing clip 70 and the first adapter 132. Therefore, the fixing clip 70 fixes the first pilot valve 41 and the second pilot valve 42 to the casing 11.

A gasket 72 is arranged on the second surface 442 of the passage forming block 44 of the first pilot valve 41. Another gasket 72 is arranged between the first surface 441 of the passage forming block 44 of the first pilot valve 41 and the second surface 442 of the passage forming block 44 of the second pilot valve 42. Also, a gasket 72 is provided between the first surface 441 of the passage forming block 44 of the second pilot valve 42 and the casing 11.

The gasket 72 that is arranged on the second surface 442 of the passage forming block 44 of the first pilot valve 41 is pressed against the passage forming block 44 of the first pilot valve 41 by the coupling portion 70b of the fixing clip 70. Thus, the surface of the coupling portion 70b of the fixing clip 70 that is close to the extending portions 70a, that is, the inner surface of the fixing clip 70, serves as a pressing surface 70f, which presses the gasket 72 against the passage forming block 44 of the first pilot valve 41.

As shown in FIGS. 5 and 6, each gasket 72 includes a first gasket hole 72a, a second gasket hole 72b, a third gasket hole 72c, a fourth gasket hole 72d, and a fifth gasket hole 72e. In a plan view of the first surface 441, the first gasket hole 72a surrounds the opening of the supply passage 61. In a plan view of the first surface 441, the second gasket hole 72b surrounds the opening of the first output passage 62. In a plan view of the first surface 441, the third gasket hole 72c surrounds the opening of the first discharge passage 64. In a plan view of the first surface 441, the fourth gasket hole 72d surrounds the opening of the second output passage 63. In a plan view of the first surface 441, the fifth gasket hole 72e surrounds the opening of the second discharge passage 65.

The gasket 72 that is arranged between the first surface 441 of the passage forming block 44 of the second pilot valve 42 and the casing 11 serves as a seal, on the first surface 441, between the supply passage 61, the first output passage 62, the second output passage 63, the first discharge passage 64, and the second discharge passage 65 of the second pilot valve 42. The gasket 72 that is arranged between the first surface 441 of the passage forming block 44 of the first pilot valve 41 and the second surface 442 of the passage forming block 44 of the second pilot valve 42 serves as a seal, on the first surface 441, between the supply passage 61, the first output passage 62, the second output passage 63, the first discharge passage 64, and the second discharge passage 65 of the first pilot valve 41. This gasket 72 also serves as a seal, on the second surface 442, between the supply passage 61, the output passage connecting recess 66, and the discharge passage connecting recess 67 of the second pilot valve 42. The gasket 72 that is arranged between the second surface 442 of the passage forming block 44 of the first pilot valve 41 and the coupling portion 70b of the fixing clip 70 serves as a seal, on the second surface 442, between the supply passage 61, the output passage connecting recess 66, and the discharge passage connecting recess 67 of the first pilot valve 41.

As shown in FIG. 1, the casing 11 has a pilot fluid supply passage 73, which is connected to the supply port 17 via the valve hole 16. The pilot fluid supply passage 73 opens in the valve hole 16 at a position connected to the supply port 17, regardless of the position of the spool valve member 15. The pilot fluid supply passage 73 is connected to the supply passage 61 of the second pilot valve 42.

The casing 11 also has a pilot fluid output passage 74, which connects the first output passage 62 of the second pilot valve 42 and the second pilot pressure chamber 38 to each other. The specific route of the pilot fluid output passage 74 is not illustrated. Further, the casing 11 has a pilot fluid discharge passage 75, which is connected to the first discharge passage 64 of the second pilot valve 42. The portion of the pilot fluid discharge passage 75 that is at the side opposite from the second pilot valve 42 is divided into a section that opens in the end face of the first coupling block 13 corresponding to the casing body 12 and a section that opens in the first facing surface 13a of the first coupling block 13.

As shown in FIGS. 1 and 7, the casing 11 has a pilot fluid output passage 76, which connects the second output passage 63 of the second pilot valve 42 and the first pilot pressure chamber 34 to each other. Further, the casing 11 has a pilot fluid discharge passage 77, which is connected to the second discharge passage 65 of the second pilot valve 42. The end of the pilot fluid discharge passage 77 that is at the side opposite from the second discharge passage 65 of the second pilot valve 42 is connected to the pilot fluid discharge passage 75. The specific routes of the pilot fluid output passage 76 and the pilot fluid discharge passage 77 are not illustrated.

As shown in FIG. 1, the second coupling block 14 of the casing 11 has a pilot fluid discharge passage 78. The pilot fluid discharge passage 78 is divided into a section that opens in the end face of the second coupling block 14 corresponding to the casing body 12 and a section that opens in the second facing surface 14a of the second coupling block 14. For example, when the first pilot valve 41 and the second pilot valve 42 are arranged closer to the side opposite from the casing body 12 in relation to the second coupling block 14, and the second pilot valve 42 is arranged between the first pilot valve 41 and the second coupling block 14, the pilot fluid discharge passage 78 is connected to the first discharge passage 64 of the second pilot valve 42.

As shown in FIGS. 1 and 2, the manifold block MB includes a block supply passage 81, a first block output passage 82, a second block output passage 83, a first block discharge passage 84, and a second block discharge passage 85. The block supply passage 81, the first block output passage 82, the second block output passage 83, the first block discharge passage 84, and the second block discharge passage 85 open in the placement surface B1. The end of the block supply passage 81 that opens in the placement surface B1 is connected to the supply port 17. The end of the first block output passage 82 that opens in the placement surface B1 is connected to the first output port 18. The end of the second block output passage 83 that opens in the placement surface B1 is connected to the second output port 19. The end of the first block discharge passage 84 that opens in the placement surface B1 is connected to the first discharge port 20. The end of the second block discharge passage 85 that opens in the placement surface B1 is connected to the second discharge port 21.

The end of the block supply passage 81 that is at the side opposite from the placement surface B1 is connected to a fluid supply source (not shown) via piping and the like. The end of the first block output passage 82 that is at the side opposite from the placement surface B1 and the end of the second block output passage 83 that is at the side opposite from the placement surface B1 are connected to a fluid pressure device (not shown) via piping and the like. The end of the first block discharge passage 84 that is at the side opposite from the placement surface B1 and the end of the second block discharge passage 85 that is at the side opposite from the placement surface B1 are connected to the atmosphere via piping and the like.

The manifold block MB further includes a first block-side pilot fluid discharge passage 86 and a second block-side pilot fluid discharge passage 87. The first block-side pilot fluid discharge passage 86 has a first end, which opens in the placement surface B1 at a position opposed to the first facing surface 13a of the first coupling block 13 and is connected to the pilot fluid discharge passage 75. The first block-side pilot fluid discharge passage 86 has a second end, which is connected to the first block discharge passage 84. The second block-side pilot fluid discharge passage 87 has a first end, which opens in the placement surface B1 at a position opposed to the second facing surface 14a of the second coupling block 14 and is connected to the pilot fluid discharge passage 78. The second block-side pilot fluid discharge passage 87 has a second end, which is connected to the second block discharge passage 85.

The block-side gasket 88 is provided between the placement surface B1 of the manifold block MB and the casing body 12. The block-side gasket 88 serves as a seal between the placement surface B1 of the manifold block MB and the casing body 12.

A first check valve 89a is attached to the first end of the first block-side pilot fluid discharge passage 86. The first check valve 89a opens when the pressure in the first check valve 89a reaches a predetermined pressure, thereby allowing fluid to flow from the pilot fluid discharge passage 75 toward the first block-side pilot fluid discharge passage 86. The first check valve 89a closes when the pressure in the first check valve 89a is lower than the predetermined pressure, thereby preventing fluid from flowing from the first block-side pilot fluid discharge passage 86 to the pilot fluid discharge passage 75.

A second check valve 89b is attached to the first end of the second block-side pilot fluid discharge passage 87. The second check valve 89b opens when the pressure in the second check valve 89b reaches a predetermined pressure, thereby allowing fluid to flow from the pilot fluid discharge passage 78 toward the second block-side pilot fluid discharge passage 87. The second check valve 89b closes when the pressure in the second check valve 89b is lower than the predetermined pressure, thereby preventing fluid from flowing from the second block-side pilot fluid discharge passage 87 to the pilot fluid discharge passage 78.

As shown in FIG. 1, the first pilot valve 41 includes a first connection terminal 91. The first connection terminal 91 is electrically connected to the coil 47 of the solenoid 46 of the first pilot valve 41. The first connection terminal 91 protrudes from an end face of the solenoid case 43 of the first pilot valve 41 that is at the side opposite from the passage forming block 44. The second pilot valve 42 also includes a second connection terminal 92. The second connection terminal 92 is electrically connected to the coil 47 of the solenoid 46 of the second pilot valve 42. The second connection terminal 92 protrudes from an end face of the solenoid case 43 of the second pilot valve 42 that is at the side opposite from the passage forming block 44.

The manifold block MB includes a circuit board 93, a first terminal 94, and a second terminal 95. The circuit board 93 receives power from an external controller such as a programmable logic controller (PLC). The first terminal 94 and the second terminal 95 are electrically connected to the circuit board 93. The first connection terminal 91 is connected to the first terminal 94 at the same time as the pilot-type electromagnetic valve 10 is mounted on the placement surface B1 of the manifold block MB. The second connection terminal 92 is connected to the second terminal 95 at the same time as the pilot-type electromagnetic valve 10 is mounted on the placement surface B1 of the manifold block MB. The electromagnetic valve manifold of the present embodiment has a plug-in structure in which, at the same time as the first pilot valve 41 and the second pilot valve 42 are installed in the manifold block MB, the first connection terminal 91 of the first pilot valve 41 and the second connection terminal 92 of the second pilot valve 42 are respectively connected to the first terminal 94 and the second terminal 95 of the manifold block MB.

An operation of the present embodiment will now be described.

It is assumed that, as shown in FIG. 3, power supply from the circuit board 93 shown in FIG. 1 to the coil 47 of the solenoid 46 of the first pilot valve 41 via the first terminal 94 and the first connection terminal 91 is interrupted, and that power is being supplied from the circuit board 93 to the coil 47 of the solenoid 46 of the second pilot valve 42 via the second terminal 95 and the second connection terminal 92.

In this case, the coil 47 of the second pilot valve 42 is excited, so that magnetic fluxes, that pass through the magnetic frame 45, the fixed iron core 48, the plunger 49, and the magnetic core 52, are generated about the coil 47. The excitation of the coil 47 generates an attractive force in the fixed iron core 48. Accordingly, the plunger 49 is attracted to the fixed iron core 48 against the urging force of the plunger spring 50. The urging force of the valve member spring 59 thus moves the pilot valve member 56 of the second pilot valve 42 away from the first valve seat 57, so that the pilot valve member 56 is seated on the second valve seat 58.

As a result, the supply passage 61 of the second pilot valve 42 and the first output passage 62 are connected to each other via the valve chamber 55, and the connection between the first output passage 62 and the first discharge passage 64 via the valve chamber 55 is blocked. Compressed fluid from the fluid supply source is supplied, as pilot fluid, to the second pilot pressure chamber 38 via the pilot fluid supply passage 73, the supply passage 61 of the second pilot valve 42, the valve chamber 55, the first output passage 62, and the pilot fluid output passage 74.

On the other hand, since no power is being supplied to the coil 47 of the solenoid 46 of the first pilot valve 41, no attractive force due to excitation of the coil 47 is generated in the fixed iron core 48. Accordingly, the plunger 49 is moved away from the fixed iron core 48 by the urging force of the plunger spring 50. The valve pushing portions 49a of the plunger 49 therefore push the pilot valve member 56 of the first pilot valve 41 toward the first valve seat 57 against the urging force of the valve member spring 59, so that the pilot valve member 56 is seated on the first valve seat 57.

As a result, the first output passage 62 and the first discharge passage 64 of the first pilot valve 41 are connected to each other via the valve chamber 55, and the connection between the supply passage 61 and the first output passage 62 via the valve chamber 55 is blocked. The pilot fluid in the first pilot pressure chamber 34 is discharged to the pilot fluid discharge passage 77 via the pilot fluid output passage 76, the second output passage 63 of the second pilot valve 42, the output passage connecting recess 66, the first output passage 62 of the first pilot valve 41, the valve chamber 55, the first discharge passage 64, the discharge passage connecting recess 67 of the second pilot valve 42, and the second discharge passage 65. The pilot fluid discharged to the pilot fluid discharge passage 77 is discharged to the atmosphere via the pilot fluid discharge passage 75, the first check valve 89a, the first block-side pilot fluid discharge passage 86, and the first block discharge passage 84.

In this manner, the discharge of pilot fluid from the first pilot pressure chamber 34 by the first pilot valve 41 and the supply of pilot fluid to the second pilot pressure chamber 38 by the second pilot valve 42 are performed, so that the spool valve member 15 moves toward the first piston accommodating recess 31. This allows the supply port 17 and the second output port 19 to be connected to each other, and the first output port 18 and the first discharge port 20 to be connected to each other. Also, the first spool packing 26 of the first valve portion 151 serves as a seal between the supply port 17 and the first output port 18, and the fourth spool packing 29 of the fourth valve portion 154 serves as a seal between the second output port 19 and the second discharge port 21.

When the spool valve member 15 moves toward the first piston accommodating recess 31, the fluid in the pilot fluid discharge passage 75 flows into the space in the first piston accommodating recess 31 that is on the opposite side of the first piston 32 from the first pilot pressure chamber 34 via the space between the first coupling block 13 and the casing body 12. Also, when the spool valve member 15 moves toward the first piston accommodating recess 31, the fluid in the space in the second piston accommodating recess 35 that is on the opposite side of the second piston 36 from the second pilot pressure chamber 38 flows into the pilot fluid discharge passage 78 via the space between the second coupling block 14 and the casing body 12.

Then, the fluid from the fluid supply source is supplied to the fluid pressure device via the block supply passage 81, the supply port 17, the second output port 19, and the second block output passage 83. Also, the fluid from the fluid pressure device is discharged to the atmosphere via the first block output passage 82, the first output port 18, the first discharge port 20, and the first block discharge passage 84.

For example, it is assumed that power is being supplied from the circuit board 93 shown in FIG. 1 to the coil 47 of the solenoid 46 of the first pilot valve 41 via the first terminal 94 and the first connection terminal 91, and that power supply from the circuit board 93 to the coil 47 of the solenoid 46 of the second pilot valve 42 via the second terminal 95 and the second connection terminal 92 is interrupted.

In this case, the coil 47 of the first pilot valve 41 is excited, so that magnetic fluxes that pass through the magnetic frame 45, the fixed iron core 48, the plunger 49, and the magnetic core 52 are generated about the coil 47. The excitation of the coil 47 generates attractive force in the fixed iron core 48. Accordingly, the plunger 49 is attracted to the fixed iron core 48 against the urging force of the plunger spring 50. The urging force of the valve member spring 59 thus moves the pilot valve member 56 of the first pilot valve 41 away from the first valve seat 57, so that the pilot valve member 56 is seated on the second valve seat 58.

As a result, the supply passage 61 of the first pilot valve 41 and the first output passage 62 are connected to each other via the valve chamber 55, and the connection between the first output passage 62 and the first discharge passage 64 via the valve chamber 55 is blocked. Then, the compressed fluid from the fluid supply source is supplied, as pilot fluid, to the first pilot pressure chamber 34 via the pilot fluid supply passage 73, the supply passage 61 of the second pilot valve 42, the supply passage 61 of the first pilot valve 41, the valve chamber 55, the first output passage 62, the output passage connecting recess 66 of the second pilot valve 42, the second output passage 63, and the pilot fluid output passage 76.

On the other hand, since no power is being supplied to the coil 47 of the solenoid 46 of the second pilot valve 42, no attractive force due to excitation of the coil 47 is generated in the fixed iron core 48. Accordingly, the plunger 49 is moved away from the fixed iron core 48 by the urging force of the plunger spring 50. The valve pushing portions 49a of the plunger 49 therefore push the pilot valve member 56 of the second pilot valve 42 toward the first valve seat 57 against the urging force of the valve member spring 59, so that the pilot valve member 56 is seated on the first valve seat 57.

As a result, the first output passage 62 and the first discharge passage 64 of the second pilot valve 42 are connected to each other via the valve chamber 55, and the connection between the supply passage 61 and the first output passage 62 via the valve chamber 55 is blocked. The pilot fluid in the second pilot pressure chamber 38 is discharged to the atmosphere via the pilot fluid output passage 74, the first output passage 62 of the second pilot valve 42, the valve chamber 55, the first discharge passage 64, the pilot fluid discharge passage 75, the first check valve 89a, the first block-side pilot fluid discharge passage 86, and the first block discharge passage 84.

In this manner, supply of pilot fluid to the first pilot pressure chamber 34 by the first pilot valve 41 and discharge of pilot fluid from the second pilot pressure chamber 38 by the second pilot valve 42 are performed, so that the spool valve member 15 moves toward the second piston accommodating recess 35. This allows the supply port 17 and the first output port 18 to be connected to each other, and the second output port 19 and the second discharge port 21 to be connected to each other. Also, the third spool packing 28 of the third valve portion 153 serves as a seal between the supply port 17 and the second output port 19, and the second spool packing 27 of the second valve portion 152 serves as a seal between the first output port 18 and the first discharge port 20.

When the spool valve member 15 moves toward the second piston accommodating recess 35, the fluid in the space in the first piston accommodating recess 31 that is on the opposite side of the first piston 32 from the first pilot pressure chamber 34 flows into the pilot fluid discharge passage 75 via the space between the first coupling block 13 and the casing body 12. Also, when the spool valve member 15 moves toward the second piston accommodating recess 35, the fluid in the pilot fluid discharge passage 78 flows into the space in the second piston accommodating recess 35 that is on the opposite side of the second piston 36 from the second pilot pressure chamber 38 via the space between the second coupling block 14 and the casing body 12.

Then, the fluid from the fluid supply source is supplied to the fluid pressure device via the block supply passage 81, the supply port 17, the first output port 18, and the first block output passage 82. Also, the fluid from the fluid pressure device is discharged to the atmosphere via the second block output passage 83, the second output port 19, the second discharge port 21, and the second block discharge passage 85.

As described above, the first pilot valve 41 supplies pilot fluid to and discharges pilot fluid from the first pilot pressure chamber 34. The second pilot valve 42 supplies pilot fluid to and discharges pilot fluid from the second pilot pressure chamber 38. The first output passage 62 and the second output passage 63 supply pilot fluid to or discharge pilot fluid from the first pilot pressure chamber 34 or the second pilot pressure chamber 38. The first discharge passage 64 and the second discharge passage 65 discharge pilot fluid in the first pilot pressure chamber 34 or the second pilot pressure chamber 38.

The pilot-type electromagnetic valve 10 of the present embodiment is of an internal pilot type, in which some of the fluid supplied to the supply port 17 is supplied to the first pilot pressure chamber 34 and the second pilot pressure chamber 38. In the pilot-type electromagnetic valve 10, the spool valve member 15 is reciprocated in the casing 11 by the pilot fluid, so that connections of the ports are switched.

The above-described embodiment provides the following advantages.

(1) The passage forming blocks 44 of the first pilot valve 41 and the second pilot valve 42 each include the supply passage 61, which opens in the first surface 441 and the second surface 442 and is connected to the valve chamber 55, the first output passage 62, which opens in the first surface 441 and are connected to the valve chamber 55, and the second output passage 63, which opens in the first surface 441. Further, the passage forming blocks 44 of the first pilot valve 41 and the second pilot valve 42 each include the output passage connecting recess 66. The output passage connecting recess 66 is provided in a section of the second surface 442 that overlaps with the opening region Z1 of the first output passage 62, which opens in the first surface 441, and is connected to the second output passage 63.

For example, the first pilot valve 41 and the second pilot valve 42 are arranged with the first surface 441 of the passage forming block 44 of the first pilot valve 41 and the second surface 442 of the passage forming block 44 of the second pilot valve 42 abutting each other, such that the first output passage 62 of the first pilot valve 41 and the output passage connecting recess 66 of the second pilot valve 42 are connected to each other. In this case, the first output passage 62 of the first pilot valve 41 is connected to the second output passage 63 of the second pilot valve 42 via the output passage connecting recess 66 of the second pilot valve 42.

Further, for example, the first pilot valve 41 and the second pilot valve 42 are arranged with the second surface 442 of the passage forming block 44 of the first pilot valve 41 and the first surface 441 of the passage forming block 44 of the second pilot valve 42 abutting each other, such that the first output passage 62 of the second pilot valve 42 and the output passage connecting recess 66 of the first pilot valve 41 are connected to each other. In this case, the first output passage 62 of the second pilot valve 42 is connected to the second output passage 63 of the first pilot valve 41 via the output passage connecting recess 66 of the first pilot valve 41.

Thus, even though the passage forming blocks 44 of the first pilot valve 41 and the second pilot valve 42 have the same passage structure, it is possible to supply pilot fluid to and discharge pilot fluid from the first pilot pressure chamber 34 of the first pilot valve 41, and supply pilot fluid to and discharge pilot fluid from the second pilot pressure chamber 38 of the second pilot valve 42. It is therefore not necessary to prepare two types of passage forming blocks having different structures to perform supply of pilot fluid to and discharge of pilot fluid from the first pilot pressure chamber 34 and perform supply of pilot fluid to and discharge of pilot fluid from the second pilot pressure chamber 38. This improves the production efficiency.

(2) The passage forming blocks 44 of the first pilot valve 41 and the second pilot valve 42 each include the first discharge passage 64, which opens in the first surface 441 and are connected to the valve chamber 55, and the second discharge passage 65, which opens in the first surface 441. Further, the passage forming blocks 44 of the first pilot valve 41 and the second pilot valve 42 each include the discharge passage connecting recess 67, which is provided in a section of the second surface 442 that overlaps with the opening region Z2 of the first discharge passage 64, which opens in the first surface 441, and is connected to the second discharge passage 65.

For example, the first pilot valve 41 and the second pilot valve 42 are arranged with the first surface 441 of the passage forming block 44 of the first pilot valve 41 and the second surface 442 of the passage forming block 44 of the second pilot valve 42 abutting each other, such that the first discharge passage 64 of the first pilot valve 41 and the discharge passage connecting recess 67 of the second pilot valve 42 are connected to each other. In this case, the first discharge passage 64 of the first pilot valve 41 is connected to the second discharge passage 65 of the second pilot valve 42 via the discharge passage connecting recess 67 of the second pilot valve 42.

Further, for example, the first pilot valve 41 and the second pilot valve 42 are arranged with the second surface 442 of the passage forming block 44 of the first pilot valve 41 and the first surface 441 of the passage forming block 44 of the second pilot valve 42 abutting each other, such that the first discharge passage 64 of the second pilot valve 42 and the discharge passage connecting recess 67 of the first pilot valve 41 are connected to each other. In this case, the first discharge passage 64 of the second pilot valve 42 is connected to the second discharge passage 65 of the first pilot valve 41 via the discharge passage connecting recess 67 of the first pilot valve 41.

Thus, even though the passage forming blocks 44 of the first pilot valve 41 and the second pilot valve 42 have the same passage structure, it is possible use different passages to supply pilot fluid to and discharge pilot fluid from the first pilot pressure chamber 34, and to supply pilot fluid to and discharge pilot fluid from the second pilot pressure chamber 38 of the second pilot valve 42. Therefore, for example, when pilot fluid is being discharged from the first pilot pressure chamber 34, the pilot fluid discharged from the first pilot pressure chamber 34 is prevented from entering the valve chamber 55 of the second pilot valve 42. The second pilot valve 42 is thus prevented from malfunctioning.

(3) The gaskets 72 are respectively arranged on the second surface 442 of the passage forming block 44 of the first pilot valve 41, between the first surface 441 of the passage forming block 44 of the first pilot valve 41 and the second surface 442 of the passage forming block 44 of the second pilot valve 42, and between the first surface 441 of the passage forming block 44 of the second pilot valve 42 and the casing 11. On the first surface 441, the gasket 72 serves as a seal between the supply passage 61, the first output passage 62, the second output passage 63, the first discharge passage 64, and the second discharge passage 65. On the second surface 442, the gasket 72 serves as a seal between the supply passage 61, the output passage connecting recess 66, and the discharge passage connecting recess 67. The gaskets 72 of the same type can be respectively arranged on the second surface 442 of the passage forming block 44 of the first pilot valve 41, between the first surface 441 of the passage forming block 44 of the first pilot valve 41 and the second surface 442 of the passage forming block 44 of the second pilot valve 42, and between the first surface 441 of the passage forming block 44 of the second pilot valve 42 and the casing 11. This improves the production efficiency.

(4) The first pilot valve 41 and the second pilot valve 42 are fixed to the casing 11 by the fixing clip 70. This configuration eliminates the necessity for insertion holes for screws, unlike a case in which the first pilot valve 41 and the second pilot valve 42 are fixed to the casing 11 by screws. Therefore, the passage forming block 44 does not have to have spaces for forming screw insertion holes. This allows the sizes of the first pilot valve 41 and the second pilot valve 42 to be reduced. Since the passage forming block 44 does not have to have spaces for forming screw insertion holes, the cross-sectional flow areas of the passages can be increased.

(5) The coupling portion 70b closes the supply passage 61, which opens in the second surface 442 of the passage forming block 44 of the first pilot valve 41, the output passage connecting recess 66, and the discharge passage connecting recess 67. Thus, no component other than the fixing clip 70 is required to close the supply passages 61, the output passage connecting recess 66, and the discharge passage connecting recess 67, which open in the second surface 442 of the passage forming block 44 of the first pilot valve 41. This reduces the number of components, thereby improving the production efficiency.

(6) The body 60 of each of the first pilot valve 41 and the second pilot valve 42 has the first valve seat 57 and the second valve seat 58, which are arranged to be opposed to each other in the moving direction of the pilot valve member 56 in the valve chamber 55. When the pilot valve member 56 is seated on the first valve seat 57, the supply passage 61 and the first output passage 62 are disconnected from each other. When the pilot valve member 56 is seated on the second valve seat 58, the first output passage 62 and the first discharge passage 64 are disconnected from each other. The supply passage 61, the first output passage 62, and the first discharge passage 64 are arranged in that order in the moving direction of the pilot valve member 56. The second output passage 63 is arranged between the first discharge passage 64 and one of the opposite side surfaces 443. The second discharge passage 65 is arranged between the first discharge passage 64 and the other one of the opposite side surfaces 443. When viewed from the first surface 441, the two extending portions 70a are arranged on the opposite sides of the opening of the supply passage 61 in the first surface 441 and on the opposite sides of the opening of the first output passage 62 in the first surface 441. These structures are advantageous in reducing the sizes of the first pilot valve 41 and the second pilot valve 42, each of which includes the first valve seat 57 and the second valve seat 58 are arranged to be opposed to each other in the moving direction of the pilot valve member 56 in the valve chamber 55.

(7) Since the passage forming blocks 44 of the first pilot valve 41 and the second pilot valve 42 are common parts, the pilot-type electromagnetic valve 10 is easy to assemble. This eliminates the necessity for machine setup during maintenance, improving the efficiency of maintenance.

The above-described embodiment may be modified as follows. The above-described embodiment and the following modifications can be combined as long as the combined modifications remain technically consistent with each other.

The first discharge passage 64 of each of the first pilot valve 41 and the second pilot valve 42 may be provided with a check valve that allows for the flow of fluid discharged from the valve chambers 55, while blocking the flow of fluid to the valve chambers 55. This further effectively prevents the pilot fluid discharged from the first pilot pressure chamber 34 from entering the valve chamber 55 of the second pilot valve 42, and prevents the pilot fluid discharged from the second pilot pressure chamber 38 from entering the valve chamber 55 of the first pilot valve 41.

The first discharge passages 64, the second discharge passages 65, and the discharge passage connecting recesses 67 may be omitted from the passage forming blocks 44 of the first pilot valve 41 and the second pilot valve 42. The passage forming blocks 44 of the first pilot valve 41 and the second pilot valve 42 may each be provided with a discharge passage that opens in the first surface 441 and the second surface 442 and is connected to the valve chamber 55.

The gasket arranged on the second surface 442 of the passage forming block 44 of the first pilot valve 41 may have a different shape from that of the gasket 72 provided between the first surface 441 of the passage forming block 44 of the first pilot valve 41 and the second surface 442 of the passage forming block 44 of the second pilot valve 42. In short, the gasket provided on the second surface 442 of the passage forming block 44 of the first pilot valve 41 simply needs to serve as a seal, on the second surface 442, between the supply passage 61, the output passage connecting recess 66, and the discharge passage connecting recesses 67.

The fixing clip 70 may be made of plastic.

Between the coupling portion 70b of the fixing clip 70 and the second surface 442 of the passage forming block 44 of the first pilot valve 41, a plate member may be provided that closes the supply passage 61, the output passage connecting recess 66, and the discharge passage connecting recess 67, which open in the second surface 442 of the passage forming block 44 of the first pilot valve 41.

The first pilot valve 41 and the second pilot valve 42 may be fixed to the casing 11 by screws. In this case, a plate member that closes the supply passage 61, the output passage connecting recess 66, and the discharge passage connecting recess 67, which open in the second surface 442 of the passage forming block 44 of the first pilot valve 41, needs to be attached to the second surface 442 of the passage forming block 44 of the first pilot valve 41.

The main valve unit V1 of the pilot-type electromagnetic valve 10 may be a dual three port-type direction-control valve, which accommodates two spool valve members in a valve hole 16. In this case, the two spool valve members are operated independently by supply of pilot fluid to and discharge of pilot fluid from the first pilot pressure chamber 34 of the first pilot valve 41, and supply of pilot fluid to and discharge of pilot fluid from the second pilot pressure chamber 38 of the second pilot valve 42.

The invention claimed is:

1. A pilot-type electromagnetic valve, comprising:
   a casing including ports;
   a spool valve member that is reciprocated in the casing to switch connections between the ports;
   a first pilot pressure chamber and a second pilot pressure chamber provided at opposite ends of the spool valve member in the casing;
   a first pilot valve that supplies pilot fluid to and discharges pilot fluid from the first pilot pressure chamber; and
   a second pilot valve that supplies pilot fluid to and discharges pilot fluid from the second pilot pressure chamber, wherein
   the first pilot valve and the second pilot valve are arranged to be adjacent to and coupled to each other,
   the first pilot valve and the second pilot valve each have a rectangular block-shaped body, the body having a first surface and a second surface located on a side opposite from the first surface, and
   each body includes
   a valve chamber in which a pilot valve member is movably accommodated,
   a supply passage that opens in the first surface and the second surface, and is connected to the valve chamber,
   a first output passage that opens in the first surface and is connected to the valve chamber, the first output passage being configured to supply pilot fluid to and discharge pilot fluid from the first pilot pressure chamber or the second pilot pressure chamber,
   a second output passage that opens in the first surface, the second output passage being configured to supply pilot fluid to and discharge pilot fluid from the first pilot pressure chamber or the second pilot pressure chamber, and
   an output passage connecting recess that is provided in a section of the second surface that overlaps with an opening region of the first output passage, which opens in the first surface, the output passage connecting recess being connected to the second output passage.

2. The pilot-type electromagnetic valve according to claim 1, wherein each body includes:
   a first discharge passage that opens in the first surface and is connected to the valve chamber, the first discharge passage being configured to discharge pilot fluid from the first pilot pressure chamber or the second pilot pressure chamber,
   a second discharge passage that opens in the first surface, the second discharge passage being configured to discharge pilot fluid from the first pilot pressure chamber or the second pilot pressure chamber, and
   a discharge passage connecting recess that is provided in a section of the second surface that overlaps with an opening region of the first discharge passage, which opens in the first surface, the discharge passage connecting recess being connected to the second discharge passage.

3. The pilot-type electromagnetic valve according to claim 2, further comprising gaskets, wherein
   each gasket serves, on the first surface, as a seal between the supply passage, the first output passage, the second output passage, the first discharge passage, and the second discharge passage, and serves, on the second surface, as a seal between the supply passage, the output passage connecting recess, and the discharge passage connecting recess, and
   the gaskets are respectively provided on the second surface of the body of the first pilot valve, between the first surface of the body of the first pilot valve and the second surface of the body of the second pilot valve, and between the first surface of the body of the second pilot valve and the casing.

4. The pilot-type electromagnetic valve according to claim 3, further comprising:
   a fixing clip that fixes the first pilot valve and the second pilot valve to the casing, wherein
   the fixing clip includes:
   two plate-shaped extending portions fixed to the casing, and
   a coupling portion that couples the extending portions to each other, and
   the first pilot valve and the second pilot valve are fixed to the casing by fixing the extending portions to the casing so that the first pilot valve and the second pilot valve are held between the coupling portion and the casing.

5. The pilot-type electromagnetic valve according to claim 4, wherein the coupling portion closes the supply passage, the output passage connecting recess, and the discharge passage connecting recess that open in the second surface of the body of the first pilot valve.

6. The pilot-type electromagnetic valve according to claim 4, wherein
   each body includes a first valve seat and a second valve seat, which are arranged to be opposed to each other in a moving direction of the pilot valve member in the valve chamber,
   when the pilot valve member is seated on the first valve seat, the supply passage and the first output passage are disconnected from each other,
   when the pilot valve member is seated on the second valve seat, the first output passage and the first discharge passage are disconnected from each other,
   the supply passage, the first output passage, and the first discharge passage are arranged in that order in the moving direction of the pilot valve member,
   when viewed in a direction orthogonal to the moving direction of the pilot valve member, the second output passage is arranged between the first discharge passage and one of two side surfaces that connect the first surface and the second surface to each other,
   the second discharge passage is arranged between the first discharge passage and the other one of the side surfaces, and
   when viewed from the first surface, the extending portions are arranged on opposite sides of an opening of the supply passage in the first surface and on opposite sides of an opening of the first output passage in the first surface.

* * * * *